(12) United States Patent
Grimm et al.

(10) Patent No.: US 7,884,494 B2
(45) Date of Patent: Feb. 8, 2011

(54) PUSHBUTTON FOR ACTUATING AN ELECTROPNEUMATIC PARKING BRAKE (EPH)

(75) Inventors: Matthias Grimm, Hannover (DE); Jens Ohlendorf, Hannover (DE)

(73) Assignee: WABCO GmbH, Hannover (DE)

( * ) Notice: Subject to any disclaimer, the term of this patent is extended or adjusted under 35 U.S.C. 154(b) by 197 days.

(21) Appl. No.: 12/085,099

(22) PCT Filed: Nov. 11, 2006

(86) PCT No.: PCT/EP2006/010832

§ 371 (c)(1),
(2), (4) Date: Dec. 4, 2008

(87) PCT Pub. No.: WO2007/071299

PCT Pub. Date: Jun. 28, 2007

(65) Prior Publication Data

US 2009/0090610 A1    Apr. 9, 2009

(30) Foreign Application Priority Data

Dec. 20, 2005 (DE) .................. 10 2005 060 810

(51) Int. Cl.
*B60L 1/00* (2006.01)
*H01H 19/00* (2006.01)

(52) U.S. Cl. ..................................... 307/10.1; 200/6 R

(58) Field of Classification Search ................. 200/6 R; 307/10.1
See application file for complete search history.

(56) References Cited

U.S. PATENT DOCUMENTS

| 4,549,050 A | * | 10/1985 | Lang ......................... 200/314 |
| 5,375,056 A | | 12/1994 | Nitschke et al. |
| 6,702,405 B1 | | 3/2004 | Balz et al. |
| 2005/0029859 A1 | | 2/2005 | Bensch et al. |

FOREIGN PATENT DOCUMENTS

| DE | 41 12 665 A1 | 10/1992 |
| DE | 198 57 393 A1 | 1/2000 |
| DE | 103 33 966 A1 | 2/2005 |
| EP | 1 504 975 B1 | 2/2005 |
| WO | WO 99/26825 | 6/1999 |
| WO | WO 99/50112 | 10/1999 |
| WO | WO 00/29268 | * 5/2000 |

* cited by examiner

*Primary Examiner*—Michael Rutland Wallis
(74) *Attorney, Agent, or Firm*—Kramer Levin Naftalis & Frankel LLP

(57) ABSTRACT

A pushbutton device for actuating an electropneumatic parking brake (EPH) of a vehicle, which is connected to an evaluating electronic unit via connecting cables. In order to detect switching processes and/or faults, the input resistance of the pushbutton device between the connecting points is evaluated, thus allowing the evaluating electronic unit to reliably detect both the switched position of the pushbutton device and potential fault conditions.

16 Claims, 4 Drawing Sheets

PUSHBUTTON FOR ACTUATING AN ELECTROPNEUMATIC PARKING BRAKE (EPH)

BACKGROUND OF THE INVENTION

The present invention relates generally to an improved pushbutton device for actuating the electropneumatic parking brake (EPH) of a vehicle.

An electropneumatic parking brake of the general type under consideration is described in DE 10336611 A1. The EPH is used to safely hold a vehicle, especially a commercial vehicle having a pneumatic brake system, during a prolonged stoppage by venting a spring-actuated brake cylinder. By venting the spring-actuated brake cylinder, the brakes, usually of the rear axle, are applied and held without additional energy input. For this purpose, the vehicle can be equipped with an electronically activated brake system (EBS) or even with a brake system that is conventionally activated via pneumatic control pressure.

To actuate the parking brake function, the known pressurized fluid operated brake system of a vehicle is provided with an electric parking brake signal transducer, which is designed as a pushbutton with three positions: neutral, parking brake and trailer checking. The detection of faults, such as contact faults or wire breaks of the signal transducer, as may be required by applicable legal regulations, is possible to only a limited extent.

DE 19838886 A1 describes an electric parking brake (EPB), which can be actuated with an operating element for parking a vehicle. Upon actuation of the operating element while the vehicle is stationary, the electric parking brake is alternately applied and released. The operating element is designed as a pushbutton with two positions and one status indicator. Fault checking of the operating element is not addressed.

WO 00/29268 describes a device and method for controlling an electrically actuated parking brake. For particularly reliable detection of the operator's command to actuate the parking brake, the input device for receiving the operator's command is redundantly designed in its individual components and, at the same time, monitored by means of an electronic control device. For this purpose, a plurality of procedures takes place cyclically within an evaluating unit of the control device in order to permit detection of a fault in the input device and also to ensure that the operator's command can be recognized. This way, it is possible to react appropriately to faults that occur and, alternatively, to place the vehicle in a safe driving condition by means of the parking brake even if the operator's command is not clearly recognized. For this purpose, fault detection is made possible by measuring potentials across resistors installed in the input device. A fault is indicated by a signaling device in the dashboard.

The known input device has considerable cabling complexity, namely eight connecting lines. Furthermore, it has a complex construction of switches and resistors and a complex evaluation method for detecting a fault. Considerable memory space is needed by the program routines in the evaluating microcontroller.

SUMMARY OF THE INVENTION

Generally speaking, in accordance with the present invention, an improved pushbutton device for actuating an electropneumatic parking brake is provided that overcomes disadvantages associated with conventional devices.

In accordance with an embodiment of the present invention, a pushbutton device connected to an evaluating electronic unit is provided for actuating an electropneumatic parking brake. The pushbutton device is simplified in terms of hardware allowing for simple detection of all switch positions and possible fault conditions to be achieved.

Because of the simple evaluation of the potentials of two connecting lines or of the input resistance between the terminal points of the inventive pushbutton device, fault detection is considerably simplified compared to conventional constructions. Cyclic querying of potentials of a plurality of resistors by means of program routines is no longer required. Rather, a simple measurement of the potential in the connecting lines of the pushbutton device is sufficient.

Still other objects and advantages of the present invention will in part be obvious and in part be apparent from the specification.

The present invention accordingly comprises the features of construction, combination of elements, and arrangements of parts which will be exemplified in the construction hereinafter set forth, and the scope of the invention will be indicated in the claims.

BRIEF DESCRIPTION OF THE DRAWINGS

The present invention will be described in more detail hereinafter on the basis of the accompanying drawings, wherein.

DETAILED DESCRIPTION OF THE PREFERRED EMBODIMENTS

Figure 1:
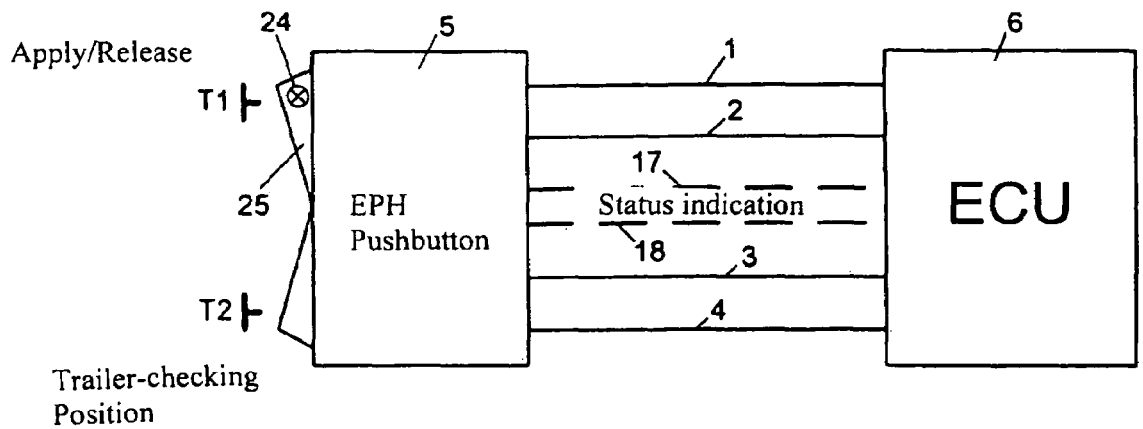
FIG. 1 is a sectional view of a pushbutton device according to an embodiment of the present invention.

Referring now to the drawing figures, FIG. 1 is a sectional view of a pushbutton, in this case EPH pushbutton (5), as well as its connection to evaluating electronic unit (ECU) (6). EPH pushbutton (5) is desirably mounted in a recess of the dashboard of a commercial vehicle (not shown). For actuation, a rocker (25) is used which can be actuated upward (key T1) as well as downward (key T2) from the illustrated neutral position.

As described hereinafter, EPH pushbutton (5) is preferably used to actuate a compressed-air operated parking brake. However, it can also be used to actuate other parking brakes, such as hydraulic parking brakes.

Key T1 is used for alternately applying and releasing the electropneumatic parking brake (not shown). Key T2 is used for applying the trailer checking position (described further below).

Signals indicating the actuation of keys T1, T2 by the operator are transmitted via lines (1) to (4) to ECU (6). Two additional lines (17, 18) routed from ECU (6) to EPH pushbutton (5) are used for the return signal (status indication) of the respective position (applied or released) of the EPH.

Lines (1) to (4) run from ECU (6) to various solenoid valves which are used for control of the parking brake. Such valves as well as the control of the parking brake achieved thereby are described in more detail in DE 10336611 A1, for example. Signals from sensors, particularly pressure sensors (not illustrated) may also be sent to ECU (6).

A signal light (24) mounted in the EPH pushbutton (5) can be used to indicate the status of the EPH to the operator. However, a separate signal light (not shown) disposed in the dashboard can also be used. This has the advantage that status indication lines (17, 18) between pushbutton (5) and ECU (6) can be dispensed with. The signal light disposed in the dashboard is advantageously connected to the associated electronic unit, in this case ECU (6), via a data bus, such as a CAN bus.

Figure 2:
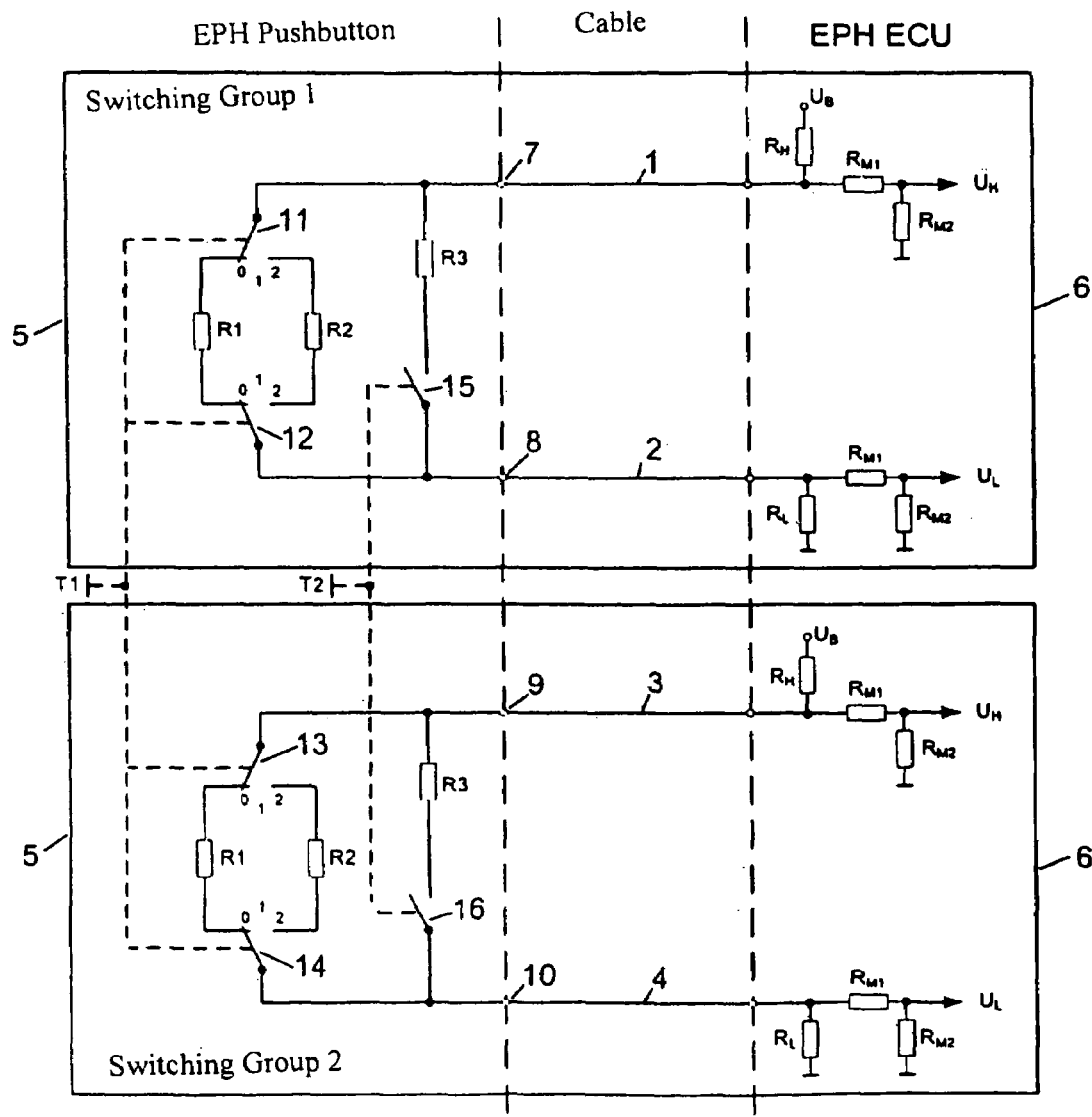
FIG. 2 is a schematic diagram of a preferred internal circuit layout of a pushbutton device according to an embodiment of the present invention.

FIG. 2 depicts the internal circuitry of EPH pushbutton (5), which includes two parallel switching groups 1 and 2 of identical layout. Because of this redundancy, it is still possible, even in the case of malfunctions in one switching group, for the ECU (6) to recognize the operator's commands from the signals of the intact switching group. For simplicity, only switching group 1 will be described hereinafter.

Switching group 1 is equipped with two resistors R1 and R2, which are disposed in parallel and can be connected by two changeover switches (11) and (12) to terminal points (7, 8) of EPH pushbutton (5). For this purpose, the base terminals of changeover switches (11) and (12) are connected to terminal points (7) and (8). The switching poles of changeover switches (11) and (12) are in contact with first resistor R1 in the home position of EPH pushbutton (5) illustrated in FIG. 1 and with second resistor R2 in the actuated position of EPH pushbutton (5). Changeover switches (11) and (12) can be actuated together with first key T1.

Moreover, an additional resistor R3 in series with an additional switch (15) is disposed in parallel with resistors R1 and R2. Upon actuation of switch (15) by second key T2, resistor R3 bridges across terminal points (7, 8). As a result, the trailer checking position (described below) is engaged. Because of the rigid coupling of keys T1 and T2 by rocker (25) (see FIG. 1), only changeover switches (11, 12) or only switch (15) can be actuated. The resistors preferably have the following values: R1=40 kohm, R2=4 kohm, R3=20 kohm.

As mentioned above, switching group 2 of EPH pushbutton (5) is used to increase the reliability by redundancy, and it contains corresponding changeover switches (13, 14) as well as switch (16). Switching group 2 has terminal points (9, 10) and is connected via connecting lines (3, 4) to ECU (6).

EPH pushbutton (5) with its switching groups 1 and 2 is connected via connecting lines (1, 2) and (3, 4), respectively, to ECU (6), which can be disposed at any desired location in the vehicle. Connecting lines (1, 2) and (3, 4) may be disposed in a common multicore cable. Within ECU (6), the upper connecting lines (1) and (3) are connected to battery voltage UB via resistor RH. The lower connecting lines (2) and (4) are connected to the frame via resistor RL.

By virtue of the circuit depicted in FIG. 2, a voltage divider is formed by resistor RH, the internal resistance of EPH pushbutton (5), and resistor RL. The resistance of EPH pushbutton (5) can vary depending on how the switches are actuated. The circuit is powered by battery voltage UB.

By means of voltage subdivision by resistors RM1 and RM2, output potentials UH and UL are formed which correspond to the usual input voltage range of microcontrollers. As described in greater detail below, these voltages are detected in analog form by evaluating ECU (6), examined for faults and used to control the electropneumatic parking brake of the vehicle.

Figure 3:
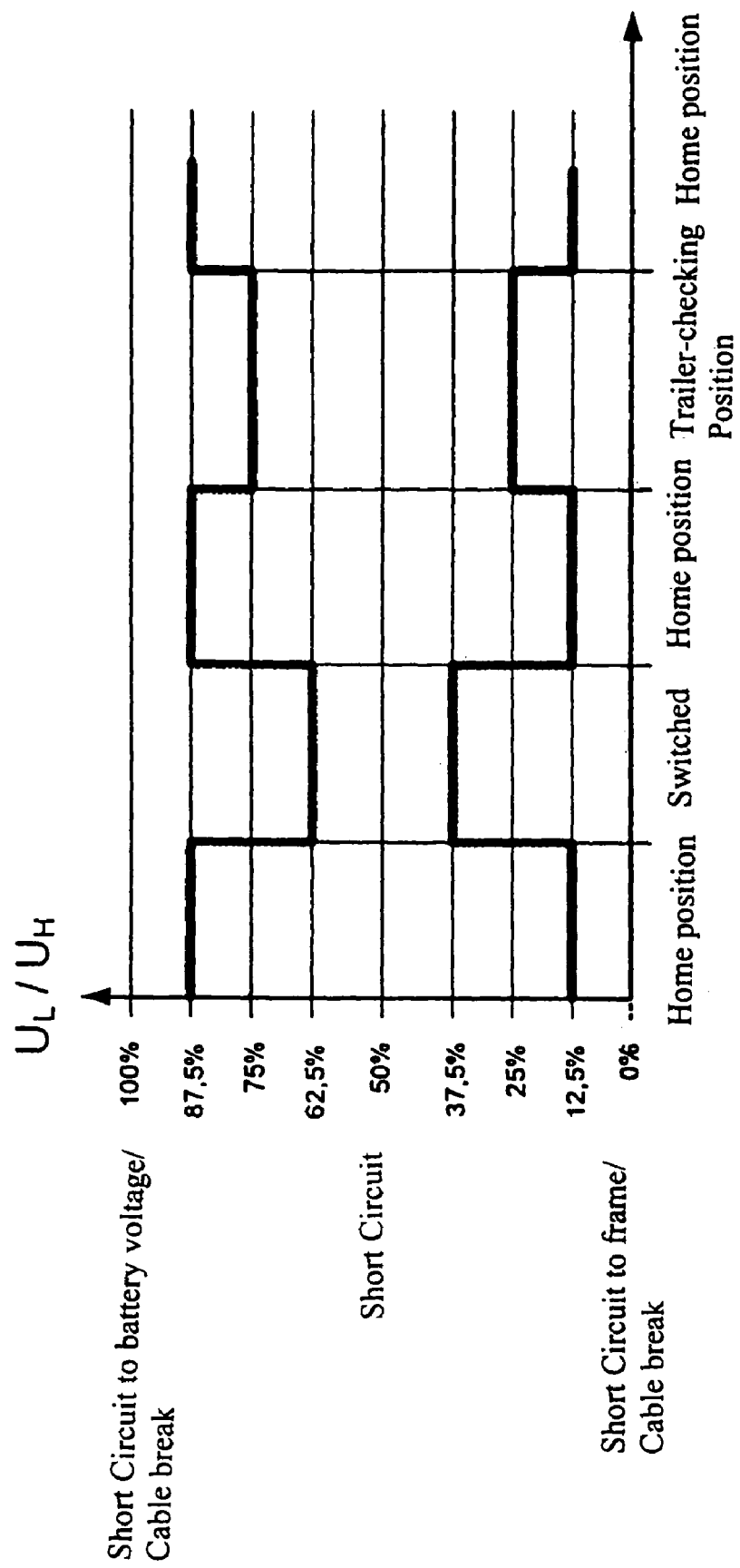
FIG. 3 is a graphical representation of possible correct and faulty output potentials based on various switch positions of a pushbutton device according to an embodiment of the present invention.

FIG. 3 depicts, in normalized form from zero to 100 percent, possible voltage potentials of UH and UL that may result during undisturbed or disturbed operation of EPH pushbutton (5). UL is illustrated in the lower half and UH in the upper half of FIG. 3. In a preferred embodiment of the present invention, UL is equal to 12.5 percent and UH is equal to 87.5 percent when EPH pushbutton (5) is in the home position illustrated in FIG. 1.

In the switched position of EPH pushbutton (5), or in other words when key T1 is activated, UL is preferably equal to 37.5 percent and UH is preferably equal to 62.5 percent. This results because the value of second resistor R2 is only approximately one tenth of the value of first resistor R1.

For the trailer checking position, or in other words when key T2 is activated, UL is preferably equal to 25 percent and UH is preferably equal to 75 percent.

In different fault situations of EPH pushbutton (5) or of connecting lines (1, 2) and (3, 4), various potentials occur for UL and UH. These are measured and evaluated in analog form by ECU (6). As a result, the respective faults can be identified and indicated by an appropriately programmed logic unit.

Three specific faults are depicted in FIG. 3.

In the case of a short circuit in the cable, or, in other words, a short circuit in the connection between connecting lines (1, 2) or (3, 4), a common potential of 50 percent occurs for UL and UH.

In the case of a cable break in connecting lines (1, 2) or (3, 4) in the unactuated position of EPH pushbutton (5) illustrated in FIG. 1, UL is equal to zero percent and UH is equal to 100 percent.

In the case of a short circuit of one of the two connecting lines (1) or (3) to the battery, a potential of 100 percent occurs for the faulty line.

In the case of a short circuit of one of the two connecting lines (2) or (4) to the frame, a potential of zero percent occurs for the faulty line. Other faults of combined nature result in potentials within the range between zero and 100 percent and can therefore be distinguished by ECU (6).

If ECU (6) detects a fault, the fault is signaled to the operator by a separate fault indicator (not illustrated), and the functional scope of the EPH is restricted appropriately such that a safe condition is reached for the vehicle.

Figure 4:
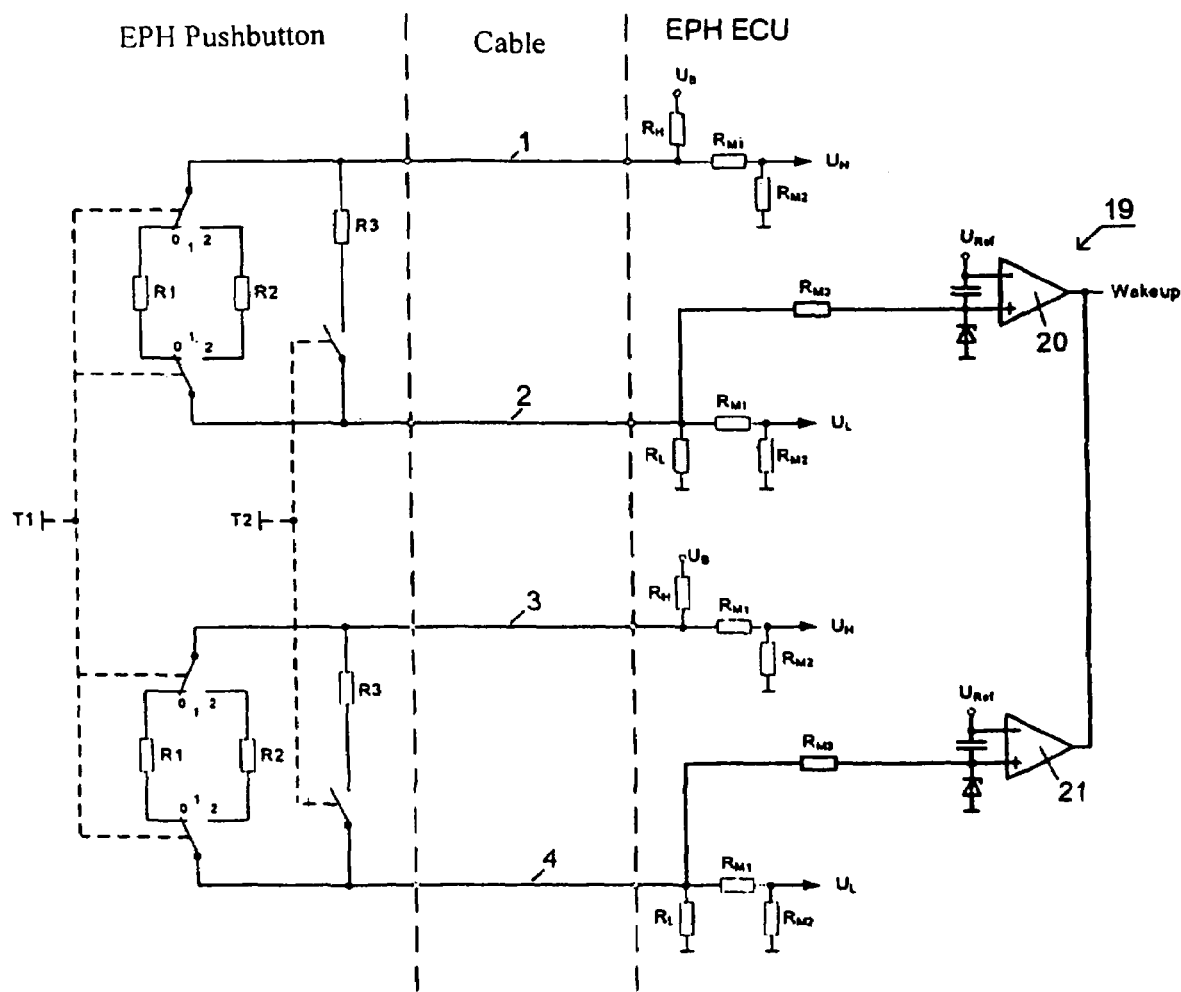
FIGS. 4 and 5 are a schematic diagrams of alternative internal circuit layouts of a pushbutton device according to embodiments of the present invention.

FIG. 4 depicts the same circuit as FIG. 2, but with an additional wake-up device (19) for ECU (6). The wake-up device (19) includes two operational amplifiers (20, 21), whose control terminals are connected via resistors RM3 to connecting lines (2) and (4) respectively. Upon actuation of one of keys T1 or T2, the respective control terminal of operational amplifiers (20, 21) receives voltage such that a wake-up signal is generated at the output.

This circuit expansion yields the advantage that ECU (6) does not constantly have to be under operating voltage but only when the EPH function (key T1 actuated) or the trailer checking position (key T2 actuated) is engaged.

The trailer checking position permits the operator to experiment with releasing the trailer brakes when the tractor vehicle is parked together with a trailer on a slope, and both parts of the vehicle train are being held by the parking brake. As a result, the operator can determine whether the brakes of the tractor are sufficient alone in this situation to hold the vehicle train stationary. If this proves not to be the case, the operator can take additional measures to further secure the train, such as, for example, by underpinning with a brake wedge.

Figure 5:
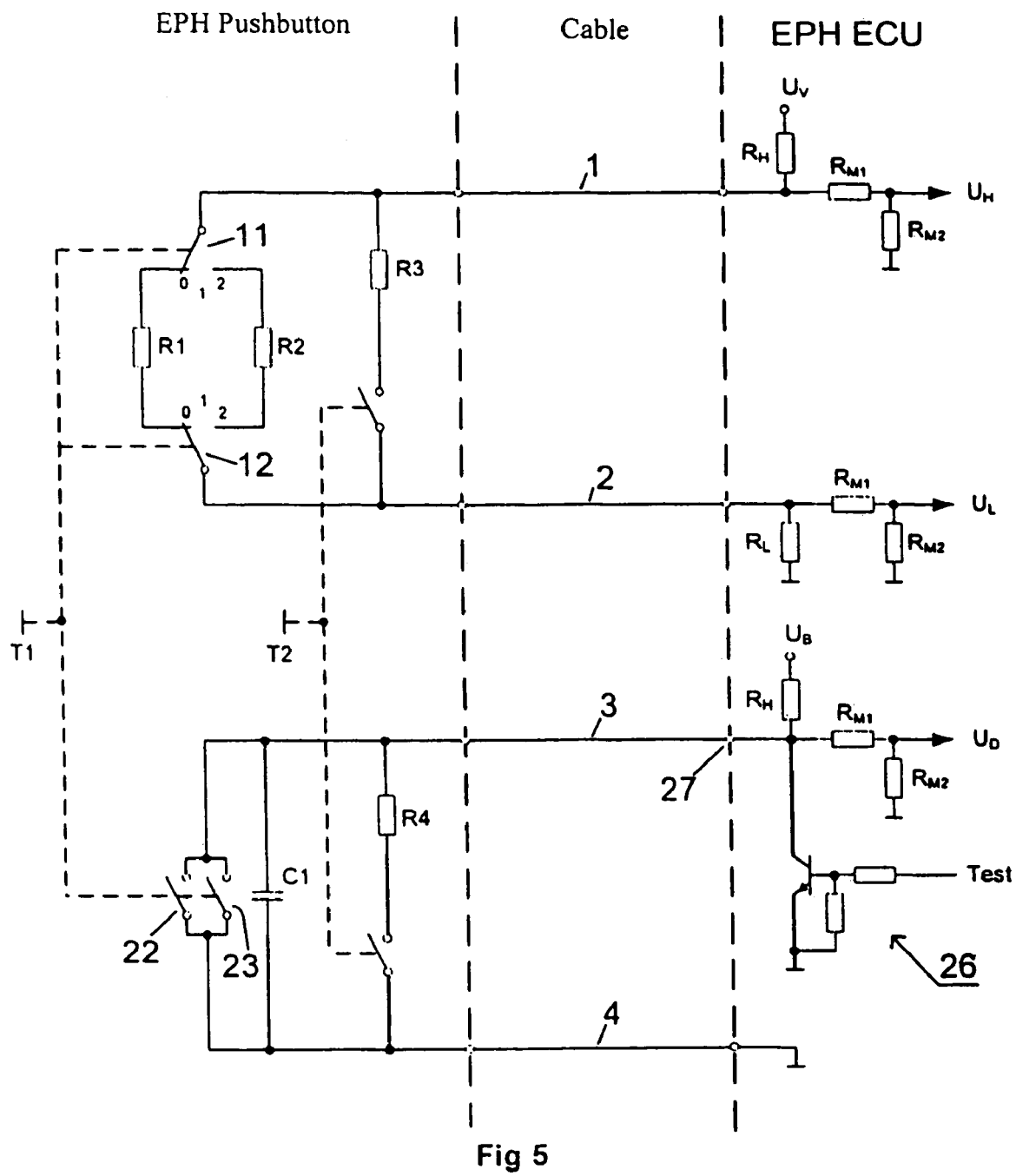

FIG. 5 depicts a simplified preferred embodiment of switching group 2 of EPH pushbutton (5), wherein switching group 2 is effective without resistors R1 and R2. Instead, two parallel switches (22, 23) are provided, which are closed when key T1 is actuated and thereby short circuit connecting lines (3, 4). Connecting line (4) is shorted to the frame within ECU (6). The connected ECU (6) detects the actuated condition of switches (22, 23) when input voltage UD drops to zero.

This alternative embodiment is advantageous in that there is no closed circuit current flow (as would take place through resistor R1 in switching group 1) and resistors R1 and R2 can be dispensed with. Nevertheless, additional complexity is introduced into this alternative embodiment because capacitor C1 must be connected in parallel in order to prevent wear of the contacts of switches (22, 23). A feature of capacitor C1 is that it discharges through switches (22, 23) when they are closed, thus achieving cleaning of the contacts.

Furthermore, because of the absence of closed circuit current in connecting lines (3, 4), the connecting lines (3, 4) need to be sporadically checked via test circuit (26) by forcing input terminal (27) of connecting line (3) to zero potential. In the case of intact lines (3, 4), a characteristic falling voltage curve of input voltage UD is recorded due to the discharge of capacitor C1 via the internal resistances of connecting lines (3, 4) and of test circuit (26), which is evaluated by ECU (6).

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

The invention claimed is:

1. A pushbutton device for actuating an electropneumatic parking brake of a vehicle, comprising:
an evaluating electronic unit connected by a first connecting line and a second connecting line, said evaluating electronic unit operable to actuate said electropneumatic parking brake and to evaluate a potential between said first and second connecting lines to detect at least one of a position of said pushbutton device and a fault of said pushbutton device; and wherein:
in said evaluating electronic unit said first connecting line is connected by a first resistor to an on-board voltage source and said second connecting line is connected by a second resistor to a frame of said vehicle.

2. The pushbutton device of claim 1, further comprising a first switching group and a second switching group, said first and second switching groups being identical, disposed in parallel, mechanically coupled and actuatable by a first key to apply and release said electropneumatic parking brake.

3. The pushbutton device of claim 1, further comprising at least two additional connecting lines routed from said evaluating electronic unit to said pushbutton device to provide an operator with a status indication concerning said electropneumatic parking brake.

4. The pushbutton device of claim 3, further comprising a signal light disposed for displaying said status indication.

5. The pushbutton device of claim 1, wherein said evaluating electronic unit includes a wake-up unit operable to generate a wake-up signal upon actuation of said pushbutton device.

6. A pushbutton device for actuating an electropneumatic parking brake of a vehicle, comprising:
an evaluating electronic unit connected by a first connecting line and a second connecting line, said evaluating electronic unit operable to actuate said electropneumatic parking brake and to evaluate a potential between said first and second connecting lines to detect at least one of a position of said pushbutton device and a fault of said pushbutton device;
a first switching group and a second switching group, said first and second switching groups being identical, disposed in parallel, mechanically coupled and actuatable by a first key to apply and release said electropneumatic parking brake;
(i) a third connecting line;
(ii) a fourth connecting line;
(iii) a first changeover switch and a second changeover switch associated with said first switching group, said first changeover switch being connected to said first connecting line and said second changeover switch being connected to said second connecting line; and
(iv) a third changeover switch and a fourth changeover switch associated with said second switching group, said third changeover switch being connected to said third connecting line and said fourth changeover switch being connected to said fourth connecting line;
said first and second changeover switches including switching poles by which contact with a first resistor is effected when said pushbutton device is in a non-actuated position; and
said third and fourth changeover switches including switching poles by which contact with a second resistor is effected when said pushbutton device is in a non-actuated position.

7. The pushbutton device of claim 6, wherein:
(i) said switching poles of said first and second changeover switches effect contact with a third resistor when said pushbutton device is in an actuated position, said third resistor being disposed in parallel with said first resistor and having a resistance value of approximately 1/10 of said first resistor; and
(ii) said switching poles of said third and fourth changeover switches effect contact with a fourth resistor when said pushbutton device is in an actuated position, said fourth resistor being disposed in parallel with said second resistor and having a resistance value of approximately 1/10 of said second resistor.

8. The pushbutton device of claim 7, further comprising:
(i) a first switch associated with said first switching group disposed in series with a fifth resistor; and
(ii) a second switch associated with said second switching group disposed in series with a sixth resistor, wherein said fifth and sixth resistors bridge terminal points of said pushbutton device upon actuation of said first and second switches.

9. The pushbutton device of claim 8, wherein said first and second switches are mechanically coupled and are actuatable by a second key for engaging a trailer checking position.

10. The pushbutton device of claim 9, wherein said first key is mechanically coupled to said second key by a rocker.

11. The pushbutton device of claim 6, wherein in said evaluating electronic unit said first connecting line is connected by a third resistor to an on-board voltage source and said second connecting line is connected by a fourth resistor to a frame of said vehicle.

12. The pushbutton device of claim 11, wherein said evaluating electronic unit is operable to evaluate in analog said potential between said first and second connecting lines after subdivision by at least two additional resistors.

13. A pushbutton device for actuating an electropneumatic parking brake of a vehicle, comprising:
an evaluating electronic unit connected by a first connecting line and a second connecting line, said evaluating electronic unit operable to actuate said electropneumatic parking brake and to evaluate a potential between said first and second connecting lines to detect at least one of a position of said pushbutton device and a fault of said pushbutton device;
a third connecting line and a fourth connecting line; and
a wake-up unit operable to generate a wake-up signal upon actuation of said pushbutton device, wherein said wake-up unit includes a first operational amplifier having a signal input and a second operational amplifier having a signal input, said signal input of said first operational amplifier being connected by a first resistor to said second connecting line and said signal input of said second operational amplifier being connected by a second resistor to said fourth connecting line.

14. A pushbutton device for actuating an electropneumatic parking brake of a vehicle, comprising
an evaluating electronic unit connected by a first connecting line, a second connecting line, a third connecting line and a fourth connecting line, said evaluating electronic unit being constructed and arranged to actuate said electropneumatic parking brake and to evaluate at least one of a potential between said first and second connecting lines and a potential between said third and fourth connecting lines to detect at least one of a position of said pushbutton device and a fault of said pushbutton device,
said pushbutton device further comprising a first switching group and a second switching group, said first and second switching groups disposed in parallel, mechanically coupled and actuatable by a first key to apply and release said electropneumatic parking brake,
said pushbutton device further comprising a first changeover switch and a second changeover switch associated with said first switching group, said first changeover switch being connected to said first connecting line and said second changeover switching being connected to said second connecting line,
said pushbutton device further comprising a first switch and a second switch associated with said second switching group, said first switch being connected to said third connecting line and said second switch being connected to said fourth connecting line,
said first and second changeover switches including switching poles by which contact with a first resistor is effected when said pushbutton device is in a non-actuated position and by which contact with a second resistor is effected when said pushbutton device is in an actuated position,
said first and second switches constructed and arranged to connect said third and fourth connecting lines when said pushbutton device is in said actuated position.

15. The pushbutton device of claim 14, further comprising a capacitor disposed in parallel with said first and second switches.

16. The pushbutton device of claim 14, wherein said evaluating electronic unit comprises a test circuit constructed and arranged to force an input terminal of said third connecting line to zero.

* * * * *